J. G. CLEMENS.
ELECTRICAL HEATING ATTACHMENT FOR SOLDERING IRONS.
APPLICATION FILED FEB. 27, 1917.
1,223,669.
Patented Apr. 24, 1917.
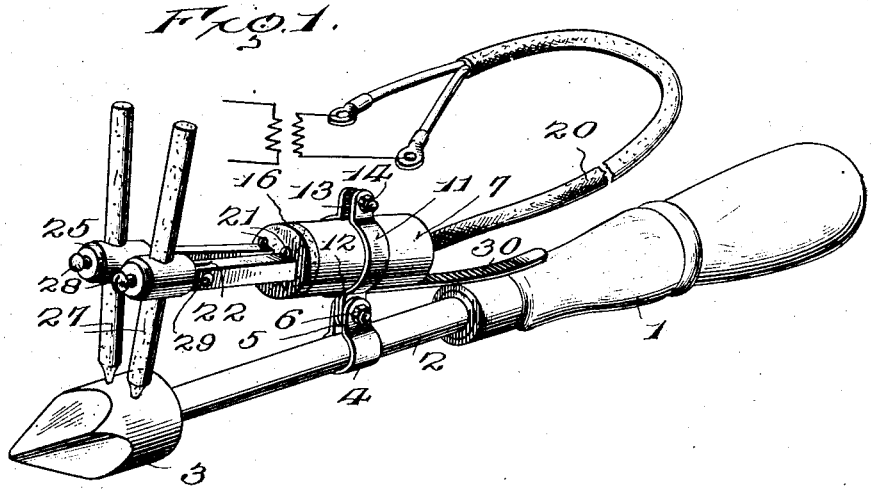
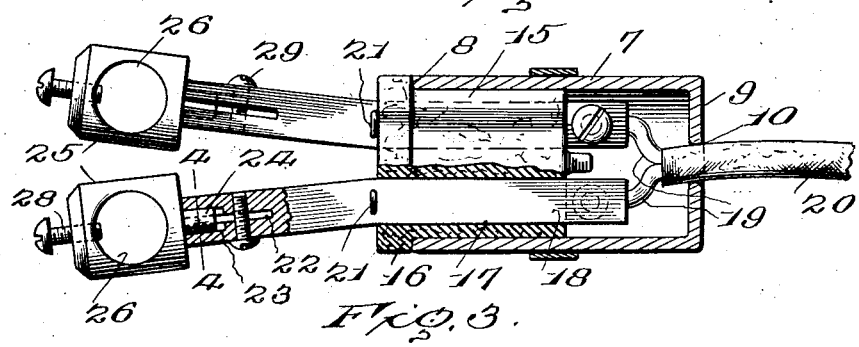
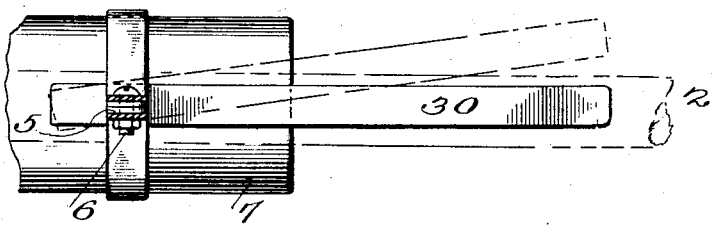
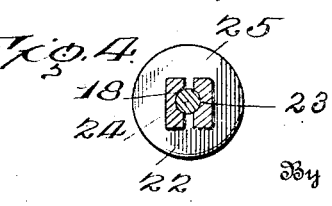
Inventor
J. G. Clemens
By
*[signature]*, Attorneys

UNITED STATES PATENT OFFICE.

JOHN G. CLEMENS, OF BUFFALO, NEW YORK.

ELECTRICAL HEATING ATTACHMENT FOR SOLDERING-IRONS.

1,223,669. Specification of Letters Patent. Patented Apr. 24, 1917.

Application filed February 27, 1917. Serial No. 151,344.

*To all whom it may concern:*

Be it known that I, JOHN G. CLEMENS, a citizen of the United States, residing at Buffalo, in the county of Erie and State of New York, have invented certain new and useful Improvements in Electrical Heating Attachments for Soldering-Irons, of which the following is a specification.

This invention relates to electric heating attachments for soldering irons and has as one of its objects to provide an attachment of this nature which may be readily and conveniently applied to any ordinary soldering iron and which when applied will automatically adjust itself to the iron in such manner that when coupled with a source of electricity it will heat the head of the iron to the desired degree of temperature.

Generally speaking, the attachment embodying the present invention includes two carbons with which are electrically connected the conductor wires leading from the source of electrical supply and it is one aim of the invention to so support these carbons that the same will be held with their points in contact with the head of the soldering iron as they are consumed. Incidentally, the invention aims to further so support the carbons that their points will be maintained in contact with the head of the soldering iron even though the carbons are consumed unevenly.

Another aim of the invention is to so support the carbons that their butt ends, in conjunction with the handle of the iron, may constitute a support for the device as a whole while not in actual use and while the iron is initially being heated, the device being adapted to be disposed upon a bench or other support with the said butt ends of the carbons and the handle of the soldering iron resting upon the bench whereby the head of the iron will be supported a sufficient distance above the bench to avoid any likelihood of the iron setting fire to the bench.

The invention also aims to provide means for normally yieldably holding the carbons in contact with the head of the soldering iron which means, however, may be rendered inactive so as to permit of the carbons being moved out of such contact in the event the iron becomes too highly heated.

The invention further aims to so mount the carbons that they may be relatively angularly adjusted as desired so as to properly space their contacting points or ends and to insure of proper contact of their said ends with the head of the iron.

In the accompanying drawings:

Figure 1 is a perspective view of the attachment embodying the present invention applied to a soldering iron of the ordinary type;

Fig. 2 is a view of the attachment partly in plan and partly in horizontal section;

Fig. 3 is a bottom plan view of a portion of the attachment;

Fig. 4 is a sectional view on the line 4—4 of Fig. 2.

In the accompanying drawing, the numeral 1 indicates the handle of a soldering iron, 2 the shank thereof, and 3 the head. The shank 2 of the soldering iron is, as usual, cylindrical in shape and slidably adjustably fitted thereon is an open collar 4 provided at its open side with ears 5 through which is passed a bolt 6 serving as a means for clamping the collar to the shank and also as a pivot, as will be presently explained. The numeral 7 indicates a cylindrical socket which is open at its forward end, as at 8, and which is closed at its rear end, as at 9, its said rear end being formed, however, with an opening 10 for the passage of the flexible conductor cord leading from the source of electric supply. Disposed to surround the socket 7 at a point between its ends are the sections of a two-part clamp 11 which at their lower ends are formed with ears 12 seating between the ears 5 and the bolt 6 passes through the ears 12 and serves as a pivot for the said clamp. Clamp members 11 are provided at their upper ends with ears 13 through which is fitted a clamping bolt 14 which may be tightened, so as to cause the members of the clamp to firmly grip the socket 7. It will now be understood that the socket 7 is supported upon the shank of the soldering iron in such manner that it may have rocking movement with relation to the said shank. This socket 7 is preferably formed of some fire-proof material such as asbestos or bakelite and loosely fitted into the open end 8 of the said socket is a cylindrical bushing 15 of insulating material, this bushing being freely rotatable within the said socket and being slightly increased in diameter at its outer end so as to form a shoulder 16 designed to seat against the forward end of the wall of the socket. The bushing 15 is formed with spaced longitudinally extending rectangular bores or openings 17 into which are fitted the inner ends of metallic posts 18 which are rectangular in cross section and which more or less snugly fit the said bores. The inner extremities of these posts project a short distance beyond the inner end of the bushing and have connected thereto the conductor wires 19 of the conductor cord 20 which cord, as before stated, is led through the opening 10. Cotter pins or other suitable elements may be fitted through the posts 18, as indicated by the numeral 21, to engage the forward end of the bushing 15 and thereby limit the distance to which the posts may be inserted into the said bushing. Beyond the forward end of the bushing the posts relatively diverge, as clearly shown in Fig. 2 of the drawing, and the outer end of each post is split longitudinally, as at 22, and is formed with a cylindrical socket 23 rotatably adjustably receiving a stud 24 carried by a head 25 having an opening 26 to receive one of the carbons, the said carbons being indicated by the numeral 27. A set screw 28 is threaded through the forward end of each head 25 and may be tightened to bear against the respective carbon whereby to hold the carbon at adjustment and when loosened to permit of adjustment of the carbon so that their contact ends may be brought opposite each other and be therefore adapted to simultaneously rest against the head 3 of the soldering iron. Clamp screws 29 are threaded through the split ends of the post 18 and may be tightened for the purpose of contracting the sockets 23 to bind the studs 24, it being understood that when these screws are loosened the rotatable engagement of the studs 24 within the sockets 23 will permit of relative angular adjustment of the heads 25 and consequently of the carbons supported thereby, thus adapting the contact ends of the carbons to be brought together or moved apart as found necessary or desirable.

As before stated, the socket 7 is pivotally supported upon the shank 2 of the soldering iron and when its forward end is rocked in the direction of the said shank the points of the carbons will be brought in contact with the head 3 of the soldering iron, as clearly shown in Fig. 1 and in order to normally hold the socket 7 rocked in this direction, a leaf spring 30 is inserted at its forward end between the outer surface of the socket 7 and the members 11 of the clamp which surrounds the socket and this spring extends rearwardly beyond the socket and rests against the handle 1 of the soldering iron for the purpose stated. It will be understood that as the carbons burn or are consumed, they will, through the action of the spring 30, be still maintained in contact with the head of the soldering iron and should one of the carbons be consumed more rapidly than the other both carbons will remain in contact with the head due to the fact that the bushing 15 is freely rotatable within the socket 7. Should it be desired to position the carbons out of contact with the head of the soldering iron, this may be readily accomplished by swinging the rear end of the spring 30 to one side, as shown in dotted lines in Fig. 3 of the drawings, so that the same will clear the handle 1. While the iron is being initially heated or when the same is not in actual use, the device as a whole may be inverted with respect to the position shown in Fig. 1 of the drawing and disposed upon a bench or any other convenient support, the butt ends of the carbons and the end of the handle 1 resting upon the said bench.

It will be understood that in the use of a heating device embodying the present invention a soldering iron with a very small head may be employed inasmuch as in the ordinary soldering iron the heads are made relatively large in order to retain the heat whereas in the instance of my invention heat is constantly supplied while the iron is in use.

Having thus described the invention, what is claimed as new is:

1. In a heating attachment for soldering irons, a member, means for mounting the member for rocking movement upon a soldering iron, electrical conductor members extending from the first-mentioned member, and means upon the second-mentioned members for supporting carbons.

2. In a heating attachment for soldering irons, a member, means for mounting the member for rocking movement upon the shank of a soldering iron, electrical conductor members extending from the first-mentioned member, means upon the second-mentioned members for adjustably supporting carbons, and means normally yieldably holding the first-mentioned member rocked in position to cause contact of the carbons with the head of the iron.

3. In a heating attachment for soldering irons, a member for application to the shank of an iron, a member mounted for rocking movement thereon, a member mounted for free rotation with relation to the rocking member, and carbon supports carried by the rotatable member.

4. In a heating attachment for soldering irons, a member for application to the shank of an iron, a member mounted for rocking movement thereon, a member mounted for free rotation with relation to the rocking member, carbon supports carried by the rotatable member, and means normally yieldably holding the rocking member in position to cause engagement of the carbons with the head of the iron.

5. In a heating attachment for soldering irons, a member for attachment to the shank of the iron, a socket mounted for rocking movement upon the said member, a bushing freely rotatably fitted within the socket, conductor posts extending from the bushing toward the head of the iron, and means at the forward end of each post for supporting a carbon.

6. In a heating attachment for soldering irons, a member for attachment to the shank of the iron, a socket mounted for rocking movement upon the said member, a bushing freely rotatably fitted within the socket, conductor posts extending from the bushing toward the head of the iron, and a carbon supporting head adjustably mounted at the forward end of each post.

7. In a heating attachment for soldering irons, a member for attachment to the shank of an iron, a socket member mounted for rocking movement upon the first-mentioned member, an insulating bushing freely rotatably mounted within the socket member, conductor posts extending from the bushing and adapted at their inner ends for connection with a source of electrical supply, and a carbon supporting head rotatably adjustably mounted at the forward end of each post.

8. In a heating attachment for soldering irons, a member for attachment to the shank of an iron, a socket member mounted for rocking movement upon the first-mentioned member, an insulating bushing freely rotatably mounted within the socket member, conductor posts extending from the bushing and adapted at their inner ends for connection with a source of electrical supply, and means at the forward ends of the posts for supporting carbons for relative angular adjustment.

9. In a heating attachment for soldering irons, a member for attachment to the shank of an iron, a socket member mounted for rocking movement upon the first-mentioned member, an insulating bushing freely rotatably mounted within the socket member, conductor posts extending from the bushing and adapted at their inner ends for connection with a source of electrical supply, each post being split at its forward end and provided with a socket, and a carbon supporting head at the forward end of each post having a stud rotatably fitting within the socket.

10. In a heating attachment for irons, a member, attaching members for the member supporting the same for rocking adjustment, carbon holders carried by the member for contact with the head of the iron, and a leaf spring supported upon the member and extending therebeyond and bearing at its free portion against a portion of the said iron, the spring being movable laterally out of such engagement.

In testimony whereof I affix my signature.

JOHN G. CLEMENS. [L. S.]